US010784794B2

(12) United States Patent
de Rooij

(10) Patent No.: US 10,784,794 B2
(45) Date of Patent: Sep. 22, 2020

(54) GAN FET GATE DRIVER FOR SELF-OSCILLATING CONVERTERS

(71) Applicant: Efficient Power Conversion Corporation, El Segundo, CA (US)

(72) Inventor: Michael A. de Rooij, Playa Vista, CA (US)

(73) Assignee: Efficient Power Conversion Corporation, El Segundo, CA (US)

( * ) Notice: Subject to any disclaimer, the term of this patent is extended or adjusted under 35 U.S.C. 154(b) by 212 days.

(21) Appl. No.: 16/114,718

(22) Filed: Aug. 28, 2018

(65) Prior Publication Data

US 2019/0068075 A1    Feb. 28, 2019

Related U.S. Application Data

(60) Provisional application No. 62/550,909, filed on Aug. 28, 2017.

(51) Int. Cl.
*H02M 7/217*    (2006.01)
*H02M 1/088*    (2006.01)
*H02M 1/08*    (2006.01)

(52) U.S. Cl.
CPC .............. *H02M 7/217* (2013.01); *H02M 1/08* (2013.01); *H02M 1/088* (2013.01)

(58) Field of Classification Search
CPC ........ H02M 1/08; H02M 1/088; H02M 1/096; H02M 7/04; H02M 7/12; H02M 7/155; H02M 7/162; H02M 7/217; H02M 7/219
See application file for complete search history.

(56) References Cited

U.S. PATENT DOCUMENTS

| 8,860,398 | B2 * | 10/2014 | Mulligan | H02M 3/155 323/315 |
| 9,954,521 | B2 * | 4/2018 | Takizawa | H02M 1/088 |

(Continued)

FOREIGN PATENT DOCUMENTS

| WO | WO-2009002541 A1 * | 12/2008 | .......... H02M 3/1588 |
| WO | WO-2017221417 A1 * | 12/2017 | .......... H03K 17/163 |
| WO | WO-2019202862 A1 * | 10/2019 | .......... H02M 3/145 |

OTHER PUBLICATIONS

M. Liu et al., "Low-Harmonic-Contents and High-Efficiency Class E Full-Wave Current-Driven Rectifier for Megahertz Wireless Power Transfer Systems", IEEE Transactions on Power Electronics, vol. 32, No. 2, pp. 1198-1209, Feb. 2017.

(Continued)

*Primary Examiner* — Matthew V Nguyen
(74) *Attorney, Agent, or Firm* — Blank Rome LLP

(57) ABSTRACT

A power converter in which two power FETs are provided in a full bridge arrangement with two diodes for supplying a rectified voltage to a load. The gates of the power FETs receive alternating and opposite voltage waveforms such that the power FETs conduct oppositely to each other. A turn-off FET is connected to the gate of each power FET to prevent spurious turn on of the power FET during periods in which the opposite power FET is turned on. A voltage sense FET is also connected to the gate of each power FET to limit the gate voltage of the power FET. The voltage sense FETs are each synchronously modulated with the corresponding power FET to limit the gate to source voltage of the voltage sense FET when the corresponding turn-off FET is on and the corresponding power FET is off.

9 Claims, 8 Drawing Sheets

(56) References Cited

U.S. PATENT DOCUMENTS

2012/0092910 A1   4/2012   Sugahara et al.
2014/0177305 A1   6/2014   Irish

OTHER PUBLICATIONS

NMLU1210 Full Bridge Rectifier Datasheet, on Semiconductor, Aug. 2013—Rev. 1.
S. Mappus, "Current Doubler Rectifier Offers Ripple Current Cancellation", Texas Instruments, Application Note SLUA323—Sep. 2004, pp. 1-8.

* cited by examiner

GAN FET GATE DRIVER FOR SELF-OSCILLATING CONVERTERS

This application claims the benefit of U.S. Provisional Application No. 62/550,909, filed on Aug. 28, 2017, the contents of which is hereby incorporated by reference.

TECHNICAL FIELD

The present invention relates to a self-oscillating power conversion circuit using GaN FET transistors.

BACKGROUND

The advantages of using gallium nitride (GaN) FETs over traditional silicon FETs are well-known. For example, GaN FETs can be made smaller for a given on-resistance and breakdown voltage than conventional silicon FETs. Besides its low on-resistance, the majority carrier characteristics of a GaN FET makes it a very low capacitance device, allowing it to switch at very high frequencies. These advantages are particularly important in self-oscillating power converters.

Known power converter circuits include the power converter circuit 100 of FIG. 1. Power converter circuit 100 includes power converter 10, which supplies a rectified voltage $V_{rect}$ to the load. Power converter 10 is a full bridge circuit in which the terminals of an AC voltage source 1 are cross-connected to the gates of FETs 2 and 3, and directly connected to the anodes of diodes 4 and 5, thus resulting in a self-oscillating converter. Capacitor $C_{out}$ smooths the rectified voltage $V_{rect}$ provided to the load. A problem with power converter circuit 100 of FIG. 1 is that it is not well suited for using GaN FETs, which typically have a gate voltage limit of 5 volts, which may be exceeded by the AC voltage source.

Power converter circuit 200 of FIG. 2 includes power converter 20, which supplies a rectified voltage $V_{rect}$ to the load, similar to the circuit of FIG. 1, but includes voltage sense FETs 26, 27 to limit the voltage applied to the gates of power FETs 22, 23, such that the voltages applied are within the gate voltage limits of GaN FETs.

A problem with power converter circuit 200 of FIG. 2 is that it is unsuitable for full implementation of the circuit with GaN FETs because of the potential for an over-voltage condition on the voltage sense FETs 26, 27. FIG. 3 shows the gate-to-source voltage of voltage sense FETs 26, 27 in waveforms 260, 270, respectively. As can be seen in these waveforms, the gate-to-source voltage of voltage sense FETs 26, 27 exceeds the 5V maximum gate voltage for GaN FETs.

SUMMARY OF THE INVENTION

To overcome the above noted disadvantages of conventional circuits, the present invention provides a power converter circuit as described above, but each of the voltage sense FETs is synchronously modulated with the corresponding power FET. A turn-off FET is connected to the gate of each power FET to prevent spurious turn on of the power FET during periods in which the opposite power FET is turned on. The synchronous modulation of each of the voltage sense FETs with the corresponding power FET limits the gate to source voltage of the voltage sense FET when the corresponding turn-off FET is on and the corresponding power FET is off. Thus, over-voltage across the voltage sense FETs is avoided, which is particularly important if the circuit is implemented using GaN FET transistors.

Other features and advantages of the invention will become apparent when the following description is read in conjunction with the accompanying drawings.

DETAILED DESCRIPTION OF THE INVENTION

Figure 1:
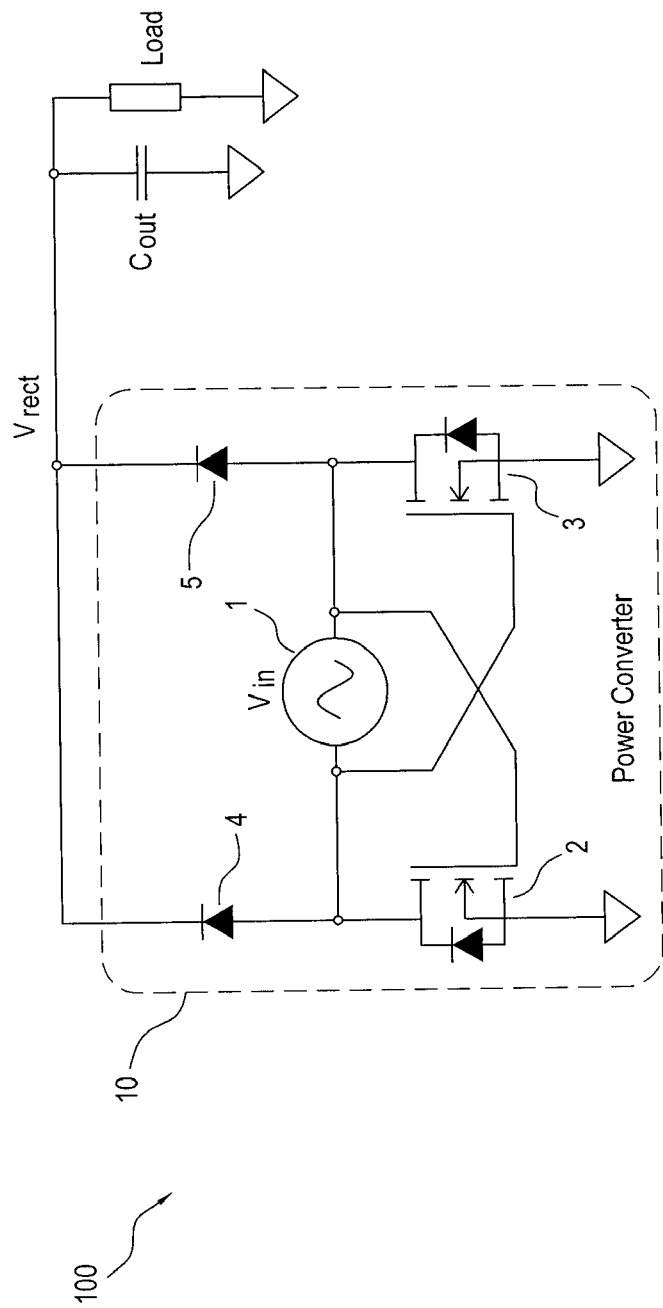
FIG. 1 shows a known power converter circuit.
Figure 2:
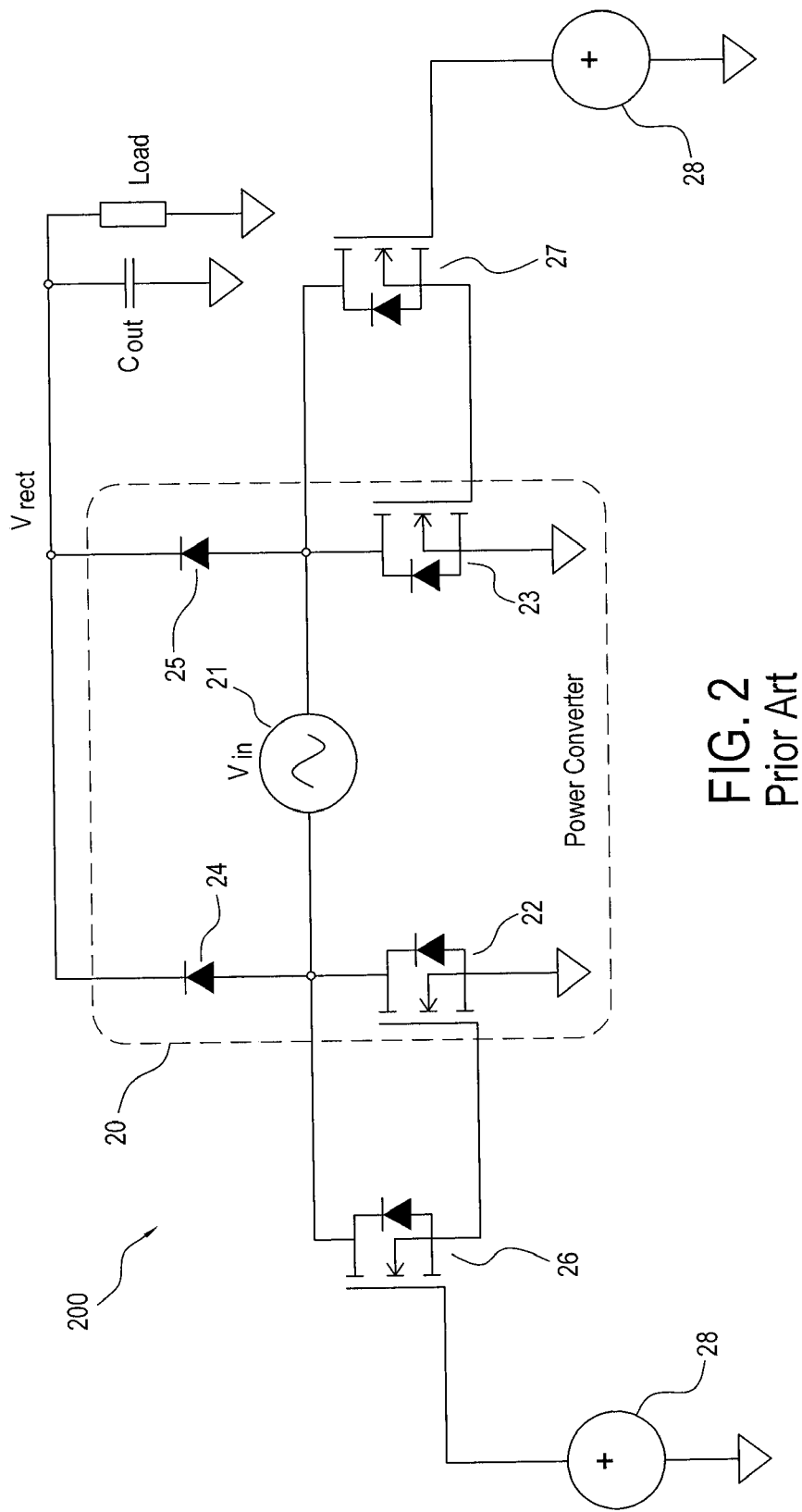
FIG. 2 shows a known power converter circuit.
Figure 3:
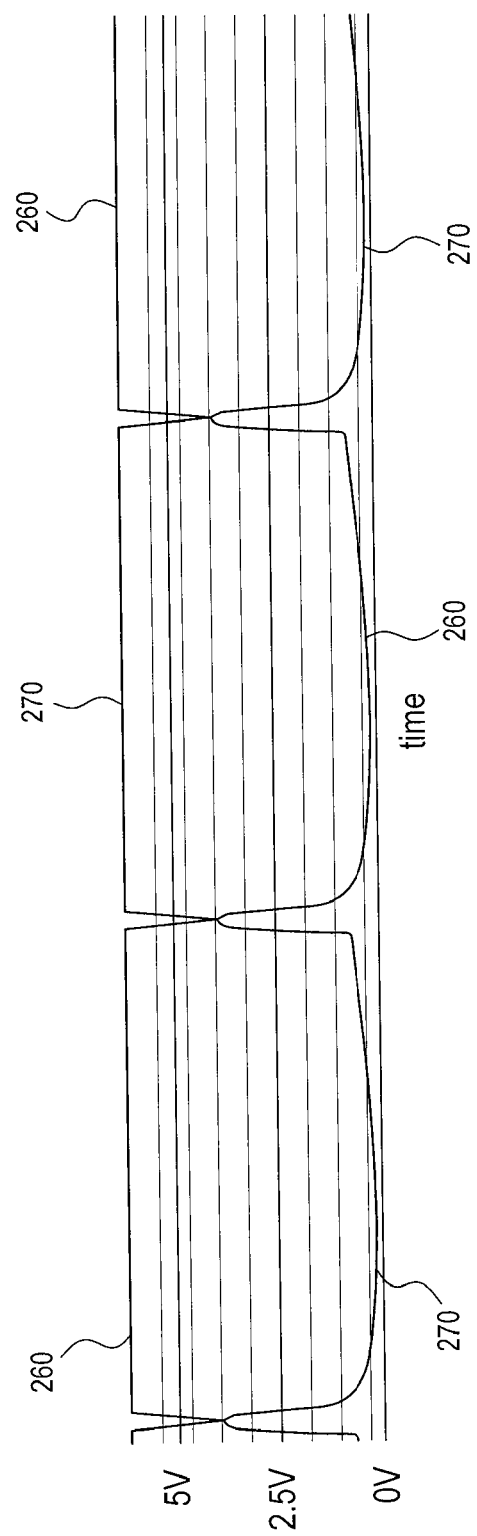
FIG. 3 shows waveforms associated with a known power converter circuit.
Figure 4:
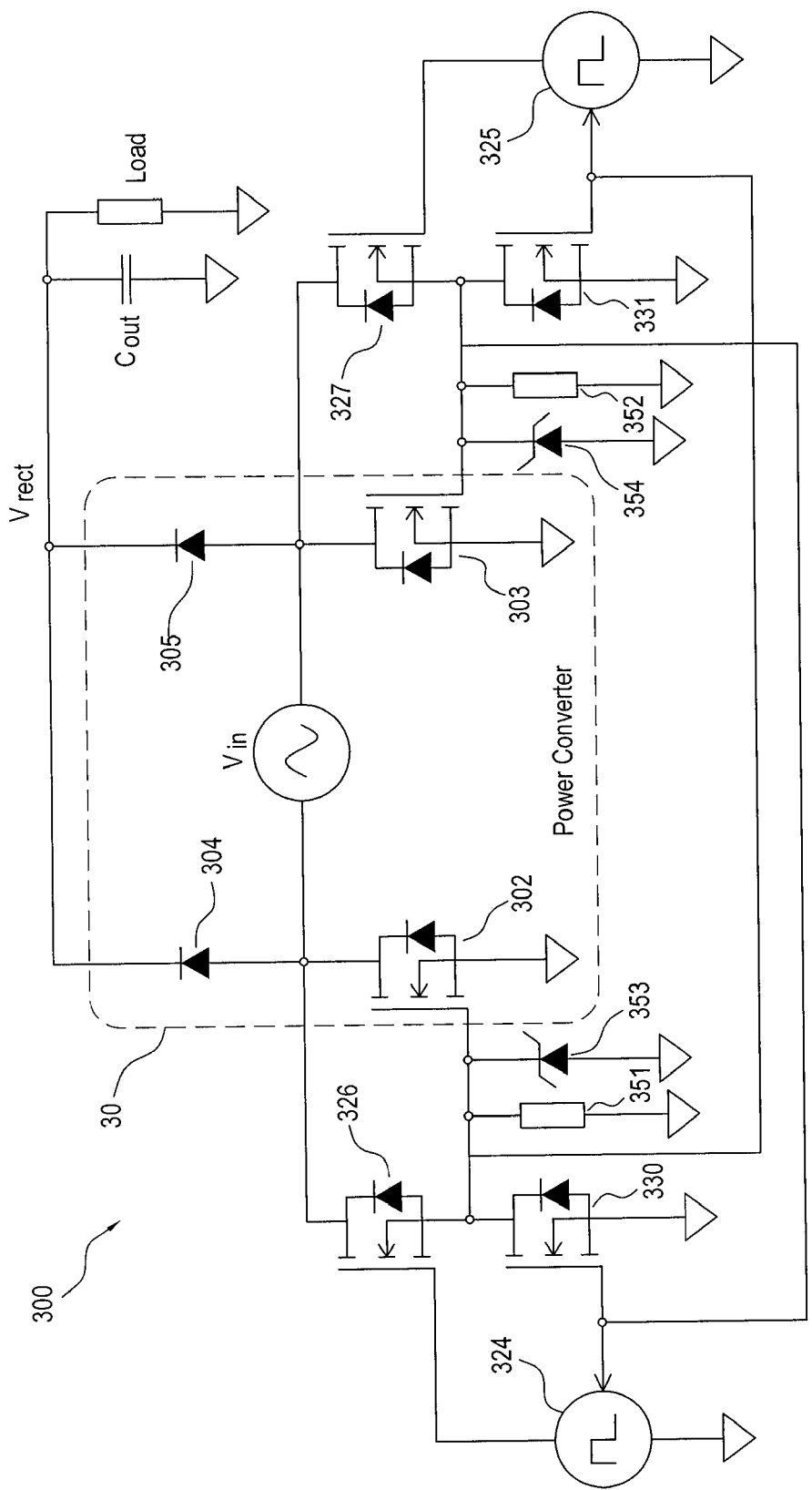
FIG. 4 shows a power converter circuit according to a first embodiment.

FIG. 4 shows a power converter circuit 300 according to a first embodiment of the present invention. Power converter circuit 300 includes power converter 30, which supplies a rectified voltage $V_{rect}$ to the load. For high frequency operation, power converter circuit 300 includes GaN turn-off FETs 330, 331, each of which is sourced by the opposite power FET gate signal and protects the GaN power FET 302, 303 that must remain off from spurious turn-on. The turn-off FET also functions to assist the voltage sense FET voltage across the gate due to the higher than a MOSFET gate current.

In the circuit of the present invention, the drains of turn-off GaN FETs 330, 331 are respectively connected to the sources of GaN zero voltage sense FETs 326, 327 and to the gates of GaN power FETs 302, 303. As described in further detail below, to prevent an over-voltage across the voltage sense FETs 326, 327, the voltage on the gate of each of the voltage sense FETs 326, 327 is synchronously modulated with the gate voltage of the corresponding power FET 302, 303, using respective current mirrors 324, 325.

Preferably, the gates of power FETs 302, 303 are also respectively coupled to voltage clamps 353, 354 to protect the gates of the power FETs 302, 303 from over-voltage. Under low voltage operation, the power FETs 302, 303 behave like diodes and the power converter circuit 300 inherently remains off and non-functional. Under these conditions, gate resistors 351, 352 are provided to keep the gates of power FETs 302, 303 at zero volts and in the off state.

In the operation of the circuit of the present invention, the voltage on the gate of each of the zero voltage sense FETs 326, 327 is modulated synchronously with the gate of the respective power FET 302, 303, using the current mirrors 324, 325. This modulation lowers the gate-source voltage of the voltage sense FET 326, 327 when the corresponding turn-off FET 330, 331 is on, to ensure that the corresponding power FET 302, 303 remains off. This part of the cycle, with the power FET off and the power FET gate voltage at zero, can result in an overvoltage across the voltage sense FET 326, 327, particularly with the voltage sense FET implemented with GaN FETs. Accordingly, the circuit of the present invention, using synchronous modulation via current mirrors 324, 325, lowers the gate voltage of the respective voltage sense FET 326, 327 during that cycle period.

The combination of these above-described features allows for extremely low latency between detection and solid gate signal generation and consumes very little power, thus allowing for very high frequency operation.

Figure 5:
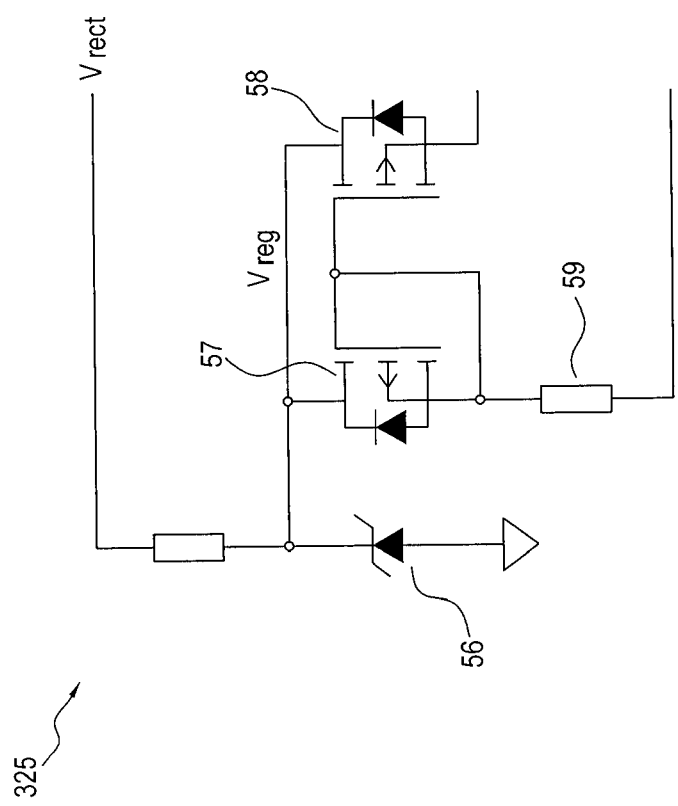
FIG. 5 shows an exemplary current mirror, according to one embodiment.

FIG. 5 shows an exemplary dynamic current mirror circuit 325 (FIG. 4) for implementing the synchronous modulation. Current mirror circuit 324 is identical to current mirror circuit 325, but is a mirror image. Current mirror circuit 325 includes p-FETs 57 and 58. The source of p-FET 58 is connected to the gate of the respective voltage sense FET 326, 327. The output DC rectified voltage $V_{rect}$ is coupled to the source of p-FET 57. Resistor 59 couples the control signal from the gate of the opposite power FET 302, 303 the source of p-FET 57 and sets the current for the current mirror circuit. If the opposite power FET gate is high (~5V), then the current will be low. If the opposite power FET gate is low (~0V), then the current will be high. Low current sets a lower $V_{Gate\_Ref}$ voltage and high current sets a higher voltage. Zener diode 56 represents a regulated supply voltage, and is the upper limit voltage for the voltage detect FET gate voltage.

Figure 6:
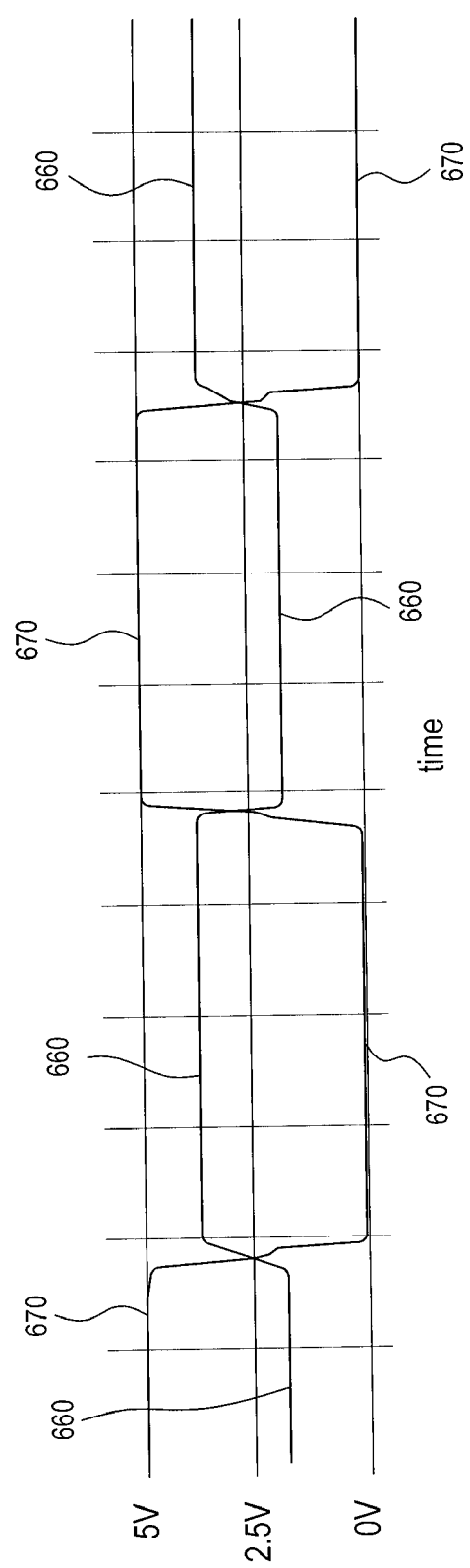
FIG. 6 shows waveforms associated with a power converter circuit according to embodiments disclosed herein.

FIG. 6 shows waveforms of two signals generated during operation of the power converter circuit 300 (FIG. 4). Waveform 660 represents the voltage on the gate of one of the power FETs 302, 303, and waveform 670 represents the gate-to-source voltage for the opposite voltage sense FET 326, 327. As is evident from line 670, the synchronization provided by the current mirror circuit lowers the gate-to-source voltage of the voltage sense FET to well within the operating limits (<5 V), but high enough to allow it to detect the voltage.

Figure 7:
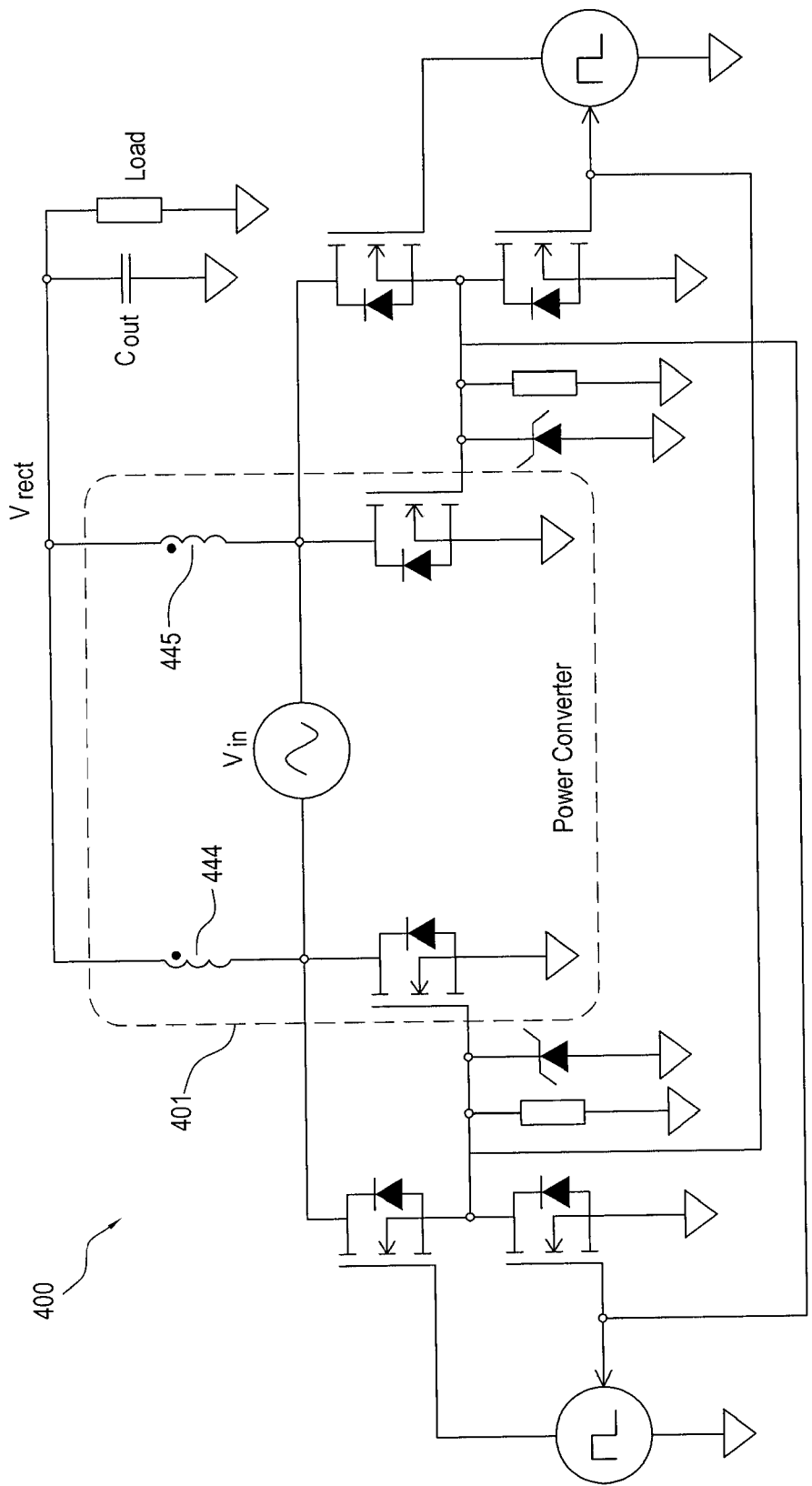
FIG. 7 shows a power converter circuit according to a second embodiment.

FIG. 7 shows power converter circuit 400 according to an alternative embodiment of the invention, i.e., with a current mode class D power converter 401, which is the same as power converter 30 of FIG. 4, except that diodes 304, 305 (FIG. 4) have been replaced with inductors 444, 445.

Figure 8:
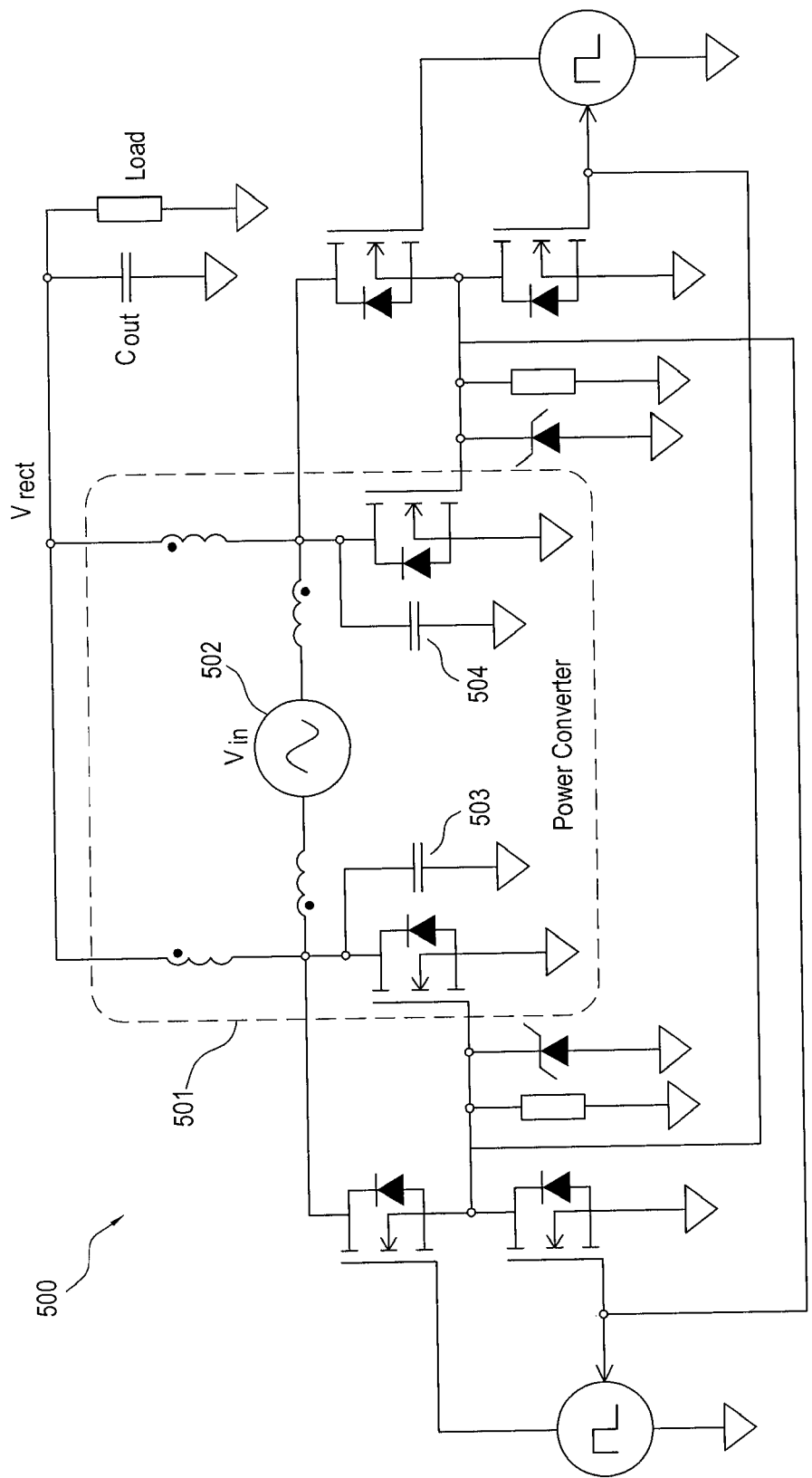
FIG. 8 shows a power converter circuit according to a third embodiment.

FIG. 8 shows power converter circuit 500 according to another embodiment, i.e., with a class E power converter 501, which differs from power converter circuit 401 of FIG. 7 in that it includes inductors 546, 547 coupled in series between the AC voltage source 502 and power FETs 502, 503, and, shunt capacitors 503, 504 coupled in parallel with power FETs 502, 503.

In accordance with the above described embodiments, the present invention advantageously provides a high frequency capable, low power consumption synchronous rectifier converter suitable for push-pull type topologies which can be implemented in GaN technology without over-voltage concerns. The benefits of using GaN FETs in the converter circuit of the present invention are: 1) lower voltage drop that lowers conduction losses as compared to diodes including Schottky diodes, and 2) higher voltage capable than diodes including Schottky diodes, extending the power capability of the converter.

In the above detailed description, reference is made to certain embodiments. These embodiments are described with sufficient detail to enable those skilled in the art to practice them. It is to be understood that other embodiments may be employed and that various structural, logical, and electrical changes may be made. Moreover, while specific embodiments are described in connection with energy transfer systems, it should be understood that features described herein are generally applicable to other types of circuits. The present invention is therefore intended to be limited only by the appended claims.

What is claimed is:

1. A power converter circuit comprising:
a power converter comprising first and second power FETs having respective gates receiving respective alternating and opposite voltage waveforms such that the first and second power FETs conduct oppositely to each other;
first and second turn-off FETs having: (i) respective drains connected to the gates of the first and second power FETs; (ii) respective sources connected to ground; and (iii) respective gates connected to the gates of opposite ones of the first and second power FETs, to prevent spurious turn on of the first and second power FETs during periods in which the opposite first and second power FETs is turned on; and
first and second voltage sense FETs having respective sources connected to the respective drains of the first and second turn-off FETs and to the respective gates of the first and second power FETs to limit the voltage applied to the respective gates of the first and second power FETs, the first and second voltage sense FETs having respective gates synchronously modulated with the first and second power FETs to limit the gate to source voltage of the voltage sense FETs when the corresponding turn-off FET is on and the corresponding power FET is off.

2. The power converter circuit of claim 1, wherein the first and second power FETs are GaN FETs.

3. The power converter circuit of claim 1, wherein the first and second turn-off FETs are GaN FETs.

4. The power converter circuit of claim 1, wherein the first and second voltage sense FETs are GaN FETs.

5. The power converter circuit of claim 1, wherein the power converter is implemented in a current-mode class D configuration.

6. The power converter circuit of claim 1, wherein the power converter is implemented in a class E configuration.

7. The power converter circuit of claim 1, further comprising first and second current mirror circuits connected to the gates of the first and second current sense FETs for synchronously modulating each of the first and second voltage sense FETs with the corresponding power FET to limit the gate to source voltage of the voltage sense FET when the corresponding turn-off FET is on and the corresponding power FET is off.

8. The power converter circuit of claim 1, further comprising first and second voltage clamps coupled to the gates of the first and second power FETs, respectively.

9. The power converter circuit of claim 1, further comprising first and second gate resistors coupled to the gates of the first and second power FETs, respectively, to maintain the respective first and second power FETs at zero volts in an off state.

* * * * *